Aug. 19, 1952 J. KRISSEL 2,607,286
PORTABLE BROILER
Filed Oct. 21, 1949
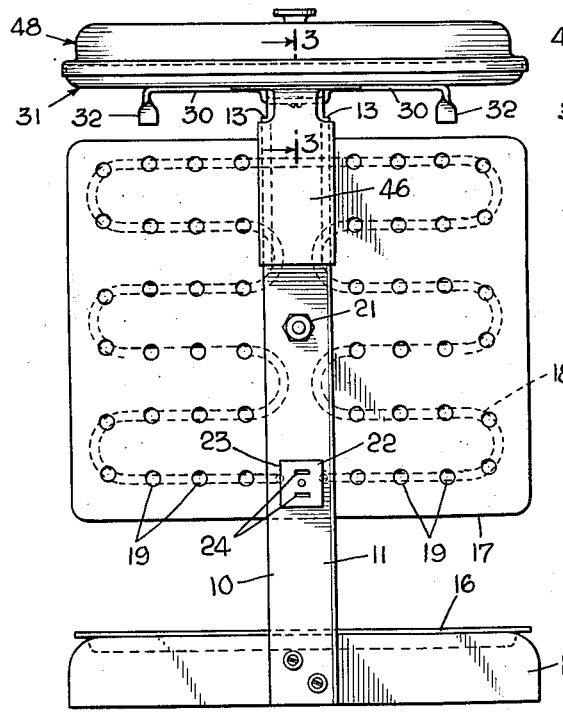
INVENTOR
JOSEPH KRISSEL
BY
Howard E. Thompson
ATTORNEY Patented Aug. 19, 1952

2,607,286

UNITED STATES PATENT OFFICE 2,607,286

PORTABLE BROILER

Joseph Krissel, Brooklyn, N. Y.

Application October 21, 1949, Serial No. 122,609

3 Claims. (Cl. 99—292)

This invention relates to portable broilers facilitating the broiling of various types of meats or the toasting of bread or the like. More particularly, the invention deals with an appliance of the character described, employing a frame with a spaced mounting of two electric heating elements therein, with means in the frame for hanging a hand or portable grill intermediate the heating elements in the operation of toasting or broiling food products.

Still more particularly, the invention deals with apparatus of the character described, having a drip pan at the lower portion thereof and a detachable service or warming pan at the top thereof, the latter further forming a heater surface which can be utilized for other purposes.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a side view of a broiler made according to my invention.

Fig. 2 is an end view with parts of the construction shown in section and with parts broken away.

Fig. 3 is an enlarged section on the line 3—3 of Fig. 1 showing only a part of the construction.

Fig. 4 is a section on the line 4—4 of Fig. 3; and

Fig. 5 is a perspective view of the portable grill detached.

In Figs. 1 and 2 of the drawing and in showing one adaptation and use of my invention, I have indicated at 10 a U-shaped frame, comprising vertical side members 11, 11' joined by a top cross-head 12, the cross-head being slightly reduced in width to form, at the upper ends of the sides 11, 11', shoulders, as seen at 13. Secured to inner adjacent surfaces of the lower portions of the sides 11, 11' are elongated leg members 14, 14', which leg members form, at their upper edges, seats for the flanges 15 of a drip pan 16. Secured to and spaced from inner surfaces of the sides 11, 11' are two electric heating units 17, 17', preferably of ceramics and each having electric heating coils, one of which is diagrammatically indicated in dotted lines at 18 in Fig. 1 of the drawing. The ceramics have suitable air circulating passages 19, note Fig. 1, for the circulation of air therethrough.

The heating units 17, 17' are preferably made of greater width than height and of an area sufficiently large to broil a reasonably large steak or four reasonably large chops, or to toast four average size slices of bread.

Each heating unit has a central outwardly extending coupling portion 20 facilitating attachment to the standards 11, 11' by bolts, screws or the like, as indicated at 21. The units also have, at the lower portions thereof, outwardly extending electric socket portions 22, preferably of rectangular form and which are adapted to fit in rectangular apertures 23 in the standards, as clearly indicated in Fig. 1. These socket portions operate to key the heater units in the frame. The socket portions 22 have either male or female electric terminals, as diagrammatically indicated at 24 in Fig. 1, for placing electric circuit wires in circuit therewith. It is preferred that a single circuit wire coming from a source of electric supply be employed with a Y-end or with diverging ends to lead to the two sockets 22. However, such structures are well-known in the art and, for this reason, the particular service wire to the broiler is not shown.

The cross-head 12 of the frame has, at the central portion thereof, two alined elongated apertures 25, 25' having enlarged upper portions 26, 26', note Fig. 2. The enlarged portions are adapted to receive head ends 27, 27' of screws or bolts which operate in the apertures 25, 25'. The screws or bolts are attached to two grill hangers 28, 28'. These grill hangers are in the form of elongated rods, the central portions of which are pressed downwardly to engage the lower surface of the cross-head 12, as seen at 29, in Fig. 3; whereas the upper surfaces of the laterally extending ends 30 of the hangers are flush with the upper surface of the cross-head 12. This construction provides a smooth surface mounting for a warming or service pan or tray 31 arranged upon the top of the cross-head and said hangers.

The terminal ends of the hangers 28, 28' have downwardly extending and inwardly curved supporting hooks 32. These hook ends 32 are all substantially of the same construction, with the exception that the outer surfaces of one pair of hooks or, in other words, the hooks at one end of the arms, are curved in the manner seen at 33 in Fig. 4 of the drawing; whereas, at the opposed ends, these curvatures are disposed at the inner surfaces of the hooks, so that, in mounting a portable grill 34 in the hangers, the grill will be fed into the hangers through the curvatures 33, which form entrance throats facilitating the spreading of the hangers against the action of a spring 35 coupled therewith centrally beneath the cross-head 12 in the manner clearly seen in Fig. 3. The spring 35 normally seats the bolts 27, 27' at adjacent ends of the apertures 25, 25'. However, upon insertion of the grill, the hangers can be spread to compensate with spreading of the grill sides 36, 37 consistent with the thickness of the food product supported therebetween. In other words, when a thin steak, chop or the like is disposed between the grill sides 36, 37, little or no spreading of the hangers will be required, but in the presence of a thick steak or the like, these hangers will spread and compensate for the size of the food being boiled.

The grill sides 36, 37 are joined at one end in coil springs, as at 38, and at the opposed end by a single coil spring 39 having a hook end 40, the latter facilitating separation of the sides 36, 37. Centrally of the last named end, the grill sides 36, 37 have extending handle portions 41, 42. These handle portions are each defined by parallel rods having cross-head ends. It will also appear that the end portion of the handle 41 is offset angularly and the sides thereof adjacent the cross-head have spaced corrugations, as at 43, which facilitate adjustable clamping of the handle members 41, 42 together consistent with spreading of the sides 36, 37.

The top cross-head rails or rods of the grill 34 are offset laterally, as seen at 44 and 45, to engage the inturned hook ends 32 of the hangers in the manner clearly indicated in Fig. 2 of the drawing. The offset rod 44 is on the grill side 36 and the offset 45 is on the grill side 37. It will, thus, be seen that the grill 34 can be easily moved into the broiler from one side thereof, spreading the hangers in this operation to the extent necessary and consistent with the food supported between the grill sides 36, 37. The springs 38, 39, in addition to providing their expansion of the grill sides to take food of different thicknesses, also automatically compensate for shrinkage in the food during the broiling process, thus, at all times, supporting the food against displacement from the grill.

The service pan or tray 31 is reinforced in its support upon the frame by downwardly extending channel brackets 46 at side portions thereof. These channel brackets have inturned side edges 47 partially enveloping the standards 11, 11'. The brackets are welded or otherwise secured to the lower surfaces of the tray or pan 31. At 48 I have shown a detachable cover, which can be used in conjunction with the tray or pan, particularly in utilizing the latter as a warmer, it being apparent that food products can be broiled and then placed on the pan while a further quantity of such products are being broiled in the appliance.

It will be apparent from a consideration of Figs. 1 and 2 of the drawing that, by reason of the dimensions of the various parts of the broiler, the entire assemblage can be conveniently packaged in a rectangular carton.

Having fully described my invention, what I claim as new and desire to secure by Letters Patent is:

1. In broilers of the character described, a U-shaped frame fashioned from an elongated narrow strip, said frame comprising a top cross-head with depending spaced side bars, other narrow strips secured centrally to the lower ends of the side bars to form wide supporting feet for the frame, a pair of wide electric heating elements mounted upon and secured centrally to inner surfaces of said side bars, said heating elements having means for connection with a source of electric supply, a grill, the cross-head of the frame having means intermediate the heating elements for detachably hanging the grill for positioning between said heating elements, the grill comprising yieldably coupled openwork sides of rectangular form, said hanger means comprising a pair of elongated arms yieldably coupled to compensate for different spacings of the grill sides, said arms having supporting hooks at their ends, the grill having laterally extending sides for engagement with the hooks of said arms.

2. In broilers of the character described, a U-shaped frame fashioned from an elongated narrow strip, said frame comprising a top cross-head with depending spaced side bars, other narrow strips secured centrally to the lower ends of the side bars to form wide supporting feet for the frame, a pair of wide electric heating elements mounted upon and secured centrally to inner surfaces of said side bars, said heating elements having means for connection with a source of electric supply, a grill, the cross-head of the frame having means intermediate the heating elements for detachably hanging the grill for positioning between said heating elements, the grill comprising yieldably coupled openwork sides of rectangular form, said hanger means comprising a pair of elongated arms yieldably coupled to compensate for different spacings of the grill sides, said arms having supporting hooks at their ends, the grill having laterally extending sides for engagement with the hooks of said arms, and said hooks having entrance throats facilitating coupling engagement of the grill therewith.

3. In broilers of the character described, a U-shaped frame fashioned from an elongated narrow strip, said frame comprising a top cross-head with depending spaced side bars, other narrow strips secured centrally to the lower ends of the side bars to form wide supporting feet for the frame, a pair of wide electric heating elements mounted upon and secured centrally to inner surfaces of said side bars, said heating elements having electric terminal portions keyed to the bars and opening outwardly therethrough, said heating elements being rectangular in form and extending to opposite sides of said bars, means upon the crosshead of the frame between and above said heating elements for hanging a grill between the heating elements, said last named means comprising a pair of elongated rods arranged transversely of said crosshead and terminating in hook ends, and said rods having means yieldably coupling the same to move longitudinally of said crossheads.

JOSEPH KRISSEL.

REFERENCES CITED

The following references are of record in the file of this patent:

UNITED STATES PATENTS

| Number | Name | Date |
|---|---|---|
| 347,306 | Stambaugh | Aug. 10, 1886 |
| 1,010,981 | Taylor | Dec. 5, 1911 |
| 1,170,414 | Christensen | Feb. 1, 1916 |
| 1,587,023 | Mottlau | June 1, 1926 |
| 1,729,552 | Shadley et al. | Sept. 24, 1929 |
| 1,903,324 | Codling | Apr. 4, 1933 |
| 1,997,192 | Kasamis | Apr. 9, 1935 |
| 2,397,040 | Pallick | Mar. 19, 1946 |

FOREIGN PATENTS

| Number | Country | Date |
|---|---|---|
| 226,387 | Great Britain | Dec. 24, 1924 |